(12) United States Patent
Nickel

(10) Patent No.: US 11,148,613 B2
(45) Date of Patent: Oct. 19, 2021

(54) DEVICE FOR A MOTOR VEHICLE

(71) Applicant: WITTE Automotive GmbH, Velbert (DE)

(72) Inventor: Andreas Nickel, Sprockhövel (DE)

(73) Assignee: WITTE Automotive GmbH, Velbert (DE)

( * ) Notice: Subject to any disclaimer, the term of this patent is extended or adjusted under 35 U.S.C. 154(b) by 0 days.

(21) Appl. No.: 16/750,254

(22) Filed: Jan. 23, 2020

(65) Prior Publication Data

US 2020/0238923 A1 Jul. 30, 2020

(30) Foreign Application Priority Data

Jan. 25, 2019 (DE) .......................... 102019101861.7

(51) Int. Cl.
*B60R 11/04* (2006.01)
*G01D 11/30* (2006.01)
(Continued)

(52) U.S. Cl.
CPC ............ *B60R 11/04* (2013.01); *G01B 5/0002* (2013.01); *G01D 11/245* (2013.01); *G01D 11/30* (2013.01);
(Continued)

(58) Field of Classification Search
CPC .... G01D 11/30; G01D 11/245; G21C 17/017; G01N 29/265; G01B 5/0002
(Continued)

(56) References Cited

U.S. PATENT DOCUMENTS 4,913,458 A * 4/1990 Hamilton ................ B60R 11/04
212/304
2015/0258944 A1* 9/2015 Buschmann ......... H04N 5/2253
348/373
(Continued)

FOREIGN PATENT DOCUMENTS

DE 102010008214 A1 9/2010
DE 102012025626 A1 4/2014
(Continued)

OTHER PUBLICATIONS

European Search Report EP20153181 with Google Translation from German to English, dated Dec. 3, 2020, 12 pages (Year: 2020).*
(Continued)

*Primary Examiner* — Clayton E. LaBalle
*Assistant Examiner* — Kevin C Butler
(74) *Attorney, Agent, or Firm* — Wiggin and Dana LLP; Gregory S. Rosenblatt; Thomas M. Landman

(57) ABSTRACT

The invention relates to a device for a motor vehicle having a protective element which can be pivoted from a closed position into an open position, with an environment detection unit which can be moved into an active position for image detection by an extension movement and into a resting position by a retraction movement, in which the environment detection unit is arranged to be externally inaccessible behind the protective element located in the closed position, and having a drive unit acting on the environment detection unit for moving the environment detection unit, the environment detection unit having an end face facing the protective element and two has adjoining side surfaces and wherein a pressing element for pressing on the protective element during the extension of the environment detection unit and a separate closing element for closing the protective element during retraction of the envi- (Continued)

Figure 1:
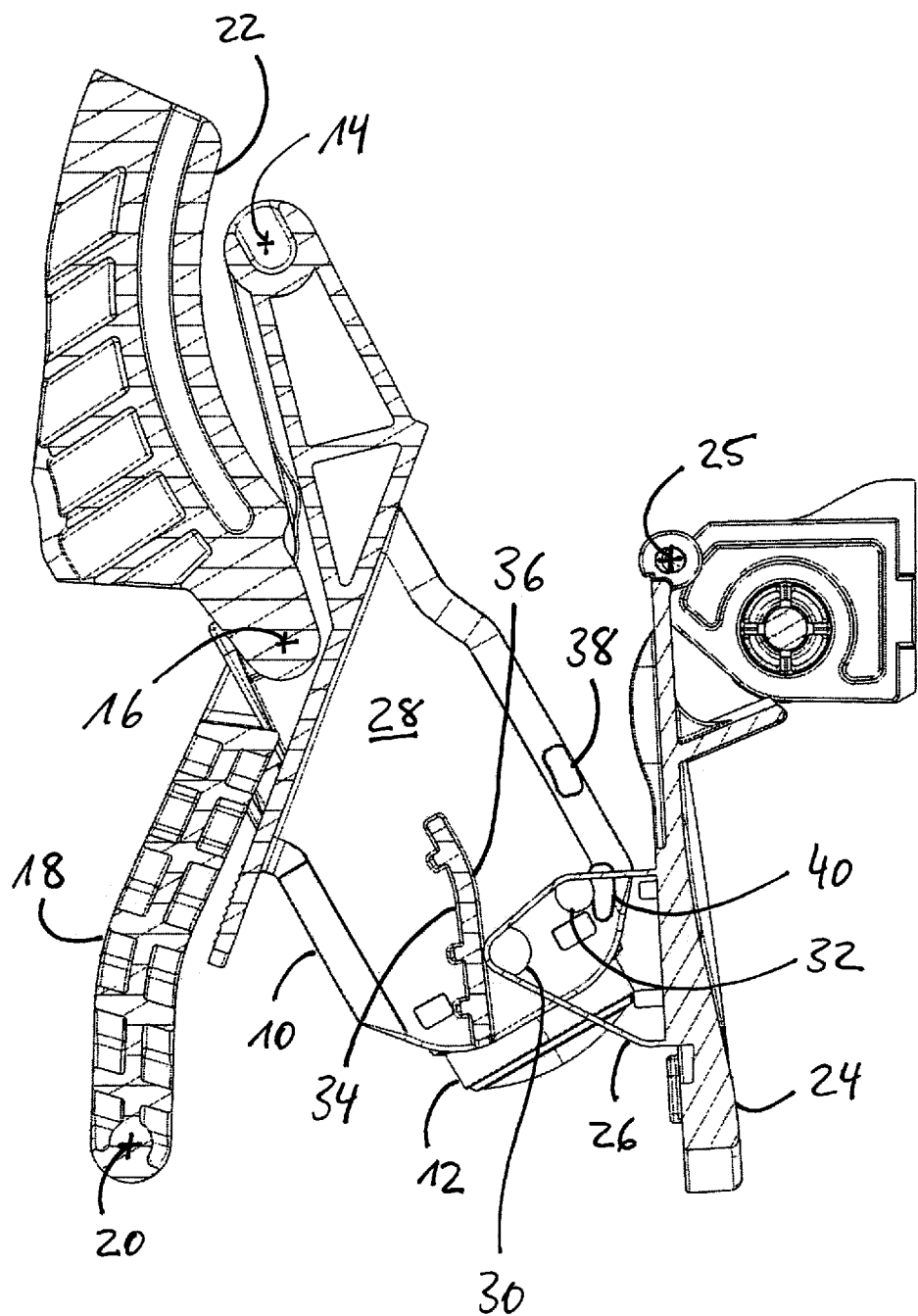

ronment detection unit are formed on at least one of the side surfaces.

18 Claims, 3 Drawing Sheets

(51) Int. Cl.
| | |
|---|---|
| *H04N 5/225* | (2006.01) |
| *G01N 29/265* | (2006.01) |
| *G21C 17/017* | (2006.01) |
| *G01B 5/00* | (2006.01) |
| *G01D 11/24* | (2006.01) |
| *B60R 11/00* | (2006.01) |

(52) U.S. Cl.
CPC ......... *G01N 29/265* (2013.01); *G21C 17/017* (2013.01); *H04N 5/2252* (2013.01); *H04N 5/2253* (2013.01); *B60R 2011/0082* (2013.01); *B60R 2011/0094* (2013.01)

(58) Field of Classification Search
USPC ........................................................ 73/866.5
See application file for complete search history.

(56) References Cited

U.S. PATENT DOCUMENTS

| | | | |
|---|---|---|---|
| 2016/0219204 A1* | 7/2016 | Nickel | .................... B60R 11/04 |
| 2020/0238923 A1* | 7/2020 | Nickel | ................. H04N 5/2253 |

FOREIGN PATENT DOCUMENTS

| | | | | |
|---|---|---|---|---|
| DE | 102015105771 A1 * | 10/2016 | ........... | G03B 17/561 |
| DE | 102015105771 A1 | 10/2016 | | |
| DE | 102017105964 A1 * | 9/2018 | ............. | B60R 11/04 |
| DE | 102017105964 A1 | 9/2018 | | |
| EP | 2524494 B1 | 11/2012 | | |

OTHER PUBLICATIONS

Search Report from German Patent and Trademark Office for DE102019101861.7, dated Oct. 9, 2019.
International Search Report from European Patent Office for PCT/EP2018/056673, dated May 22, 2018.
Communication from European Patent Office for EP20153181.1-1132, dated Mar. 20, 2020.

\* cited by examiner

DEVICE FOR A MOTOR VEHICLE

The present invention relates to a device for a motor vehicle having a protective element, which can be pivoted from a closed position into an open position, having an environment detection unit, which can be brought into an active position for image acquisition by an extension movement and by a retraction movement into a resting position, in which the environment detection unit is arranged to be externally inaccessible behind the protective element in the closed position, and having a drive unit acting on the environment detection unit for moving the environment detection unit, the environment detection unit having an end face facing the protective element and two adjoining side surfaces.

In a known device of the type mentioned at the outset, the protective element is held in the closed position by a spring element and pressed onto the end face of the extending environment detection unit. Due to a decreasing resetting force of the spring element over time and/or vibrations occurring during driving operation, these devices have the problem, however, that the environment detection unit cannot be reliably and permanently protected from external influences, such as dust and/or moisture, in its resting position.

A device is also known in which the environment detection unit and the protective element are articulated, that is, permanently engaged with each other. In this case, the driven environment detection unit not only presses the protective element into the open position, but also pulls the protective element back into the closed position. This basically guarantees better protection of the environment detection unit against external influences. However, the problem with this device is that a pivot axis of the environment detection unit, a pivot axis of the protective element and an articulation axis of the connection joint between the environment detection unit and the protective element must be exactly aligned for a trouble-free and low-noise operation of the device, which will not always be the case in practice due to tolerances.

The invention has for its object to provide a device of the type mentioned, which not only reliably protects the environment detection unit permanently in its resting position from external influences, but also permanently ensures perfect mechanical function.

The object is achieved by a device with the features of claim 1 and in particular in that a pressing element for pressing on the protective element during the extension of the environment detection unit and a separate closing element for closing the protective element during retraction of the environment detection unit are formed on at least one of the side surfaces.

The invention is based on the general idea of not permanently and in particular not articulately connecting the environment detection unit to the protective element, but instead providing pressing and closing elements separate from one another for moving the protective element on the environment detection unit. By dispensing with an articulated connection between the environment detection unit and the protective element, an additional degree of freedom is created, which means that the device is less sensitive to tolerances, in particular in the orientation of a pivot axis of the protective element relative to an axis of rotation of the environment detection unit. This not only ensures a permanently reliable mechanical function of the device, but also minimizes the development of noise during the operation of the device, in particular during the extension and retraction movement of the environment detection unit. By relocating pressing element and closing element on the side surface of the environment detection unit, in other words by the lateral arrangement of the pressing element and closing element, the distance between the environment detection unit and the protective element can also be minimized and thus a more compact design of the device can be achieved.

The environment detection unit can comprise, for example, a camera, a LiDAR, LaDAR or radar device or other optical sensor which is suitable for detecting the vehicle environment. Furthermore, it is conceivable that the environment detection unit is arranged behind the emblem of a vehicle manufacturer. The protective element can basically be formed by the emblem itself. However, the protective element is preferably designed in the form of a separate camera cover, which is optionally arranged between the emblem and the environment detection unit.

Advantageous embodiments of the invention can be found in the dependent claims, the description and the drawing.

According to one embodiment, the pressing element forms a lateral rib, through which the protective element can be pivoted into the open position when the environment detection unit is extended via a first cam of the protective element supported on the rib.

The closing element is preferably temporarily effective, in particular it can only be used during an end phase of the retraction movement of the environment detection unit, i.e. when the retracting environment detection unit approaches its resting position. In other words, the closing element and the protective element only come into engagement shortly before reaching the resting position, namely only to finally pull the protective element into the closed position, while the pulling element and the protective element are disengaged during the predominant part of the retraction movement of the environment detection unit. For example, the closing element can be formed by a lateral projection.

According to a further advantageous embodiment, a securing element for securing the protective element is formed on the side area of the environment detection unit located in the active position.

The securing element is preferably arranged separate from the pressing element and the closing element. For example, it can be formed by a lateral projection of the environment detection unit.

The securing element is advantageously temporarily effective, in particular it can only be used during an end phase of the extension movement of the environment detection unit, i.e. when the extending environment detection unit approaches its active position. In other words, the securing element and the protective element only come into engagement shortly before reaching the active position, while the securing element and the protective element are disengaged during the predominant part of the retracting movement of the environment detection unit.

According to one embodiment, the protective element comprises a second cam which can be gripped behind by the securing element when the environment detection unit is in the active position, in particular in such a way that the first and second cams of the protective element are accommodated without play between the pressing element and the securing element.

Accordingly, the protective element can comprise a second cam which can be gripped behind by the closing element when the environment detection unit is in the resting position, in particular in such a way that the first and second cams of the protective element are accommodated between the pressing element and the closing element without play.

This second cam is preferably the second cam which is also in engagement with the securing element.

For a balanced distribution of forces, a pressing element, a closing element and/or a securing element is/are preferably formed on opposite side surfaces of the environment detection unit.

According to a further embodiment, the protective element comprises at least one extension, which overlaps with a side surface of the environment detection unit and on which a first cam and/or a second cam are/is formed.

For a balanced distribution of forces, the protective element advantageously comprises two extensions which overlap with opposite side surfaces of the environment detection unit and on which a first and/or a second cam are/is formed.

The or each side surface of the environment detection unit is preferably oriented essentially at right angles to the protective element.

According to a further embodiment, the environment detection unit is rotatably mounted around a first and a second axis of rotation. This allows camera movements to be realized that go beyond a simple rotation and enable a more compact design of the device as a whole.

The first axis of rotation can be guided in a sliding manner in a, in particular curved, backdrop and/or the second axis of rotation can be arranged on a pivoting arm, which in turn can be pivoted about a third axis of rotation.

According to a further embodiment, the drive unit comprises a curved toothed rack connected to environment detection unit, in particular in an articulated manner. The curvature of the toothed rack, which can be driven, for example, by a drive motor, in particular an electric motor, contributes to a more compact overall design of the device.

A particularly good protection of the environment detection unit in the resting position against external influences is achieved if the protective element is pulled through the environment detection unit in the resting position against a sealing element which is arranged in the region of a housing opening to be closed by the protective element. The sealing element advantageously surrounds the housing opening at least approximately completely.

Furthermore, a spring element can be provided, against the resetting force of which the protective element can be pivoted from the closed position into the open position.

The invention is explained below purely by way of example with reference to an embodiment with reference to the accompanying drawings.

Figure 2:
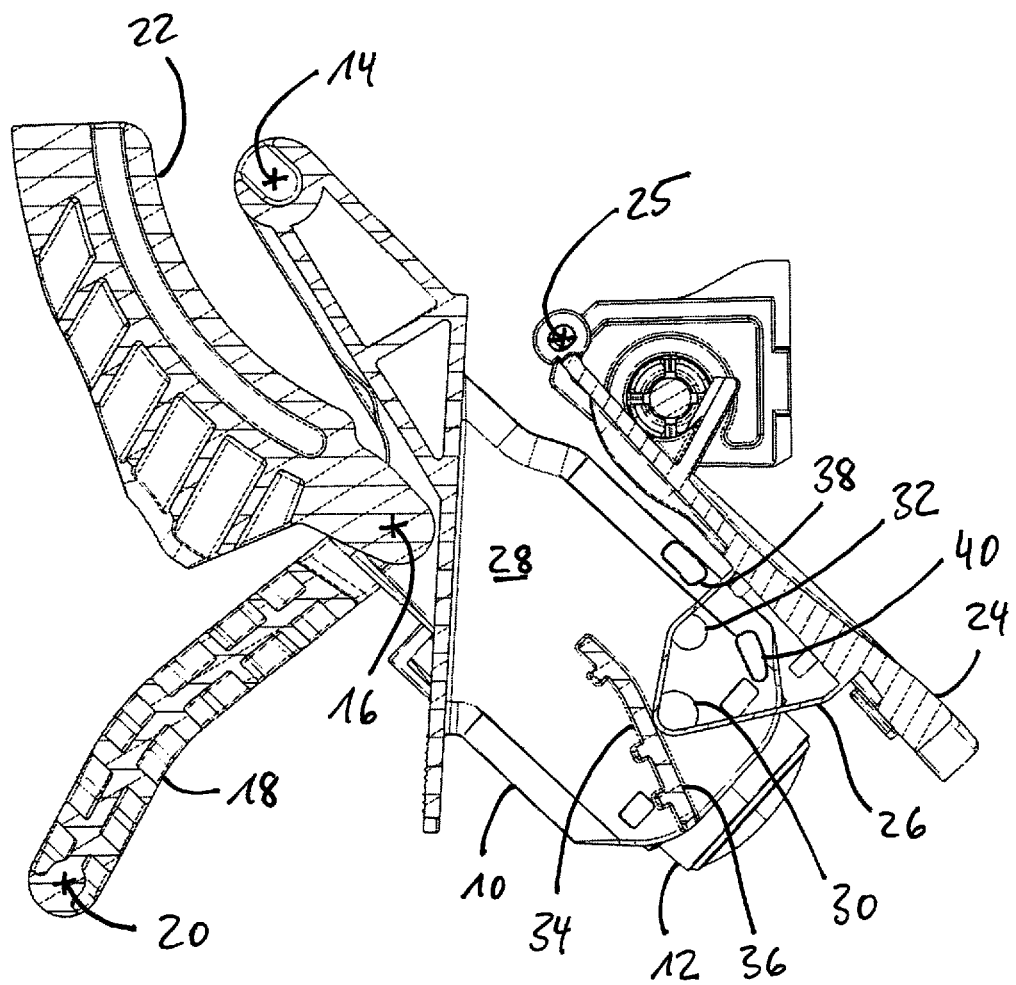
Figure 3:
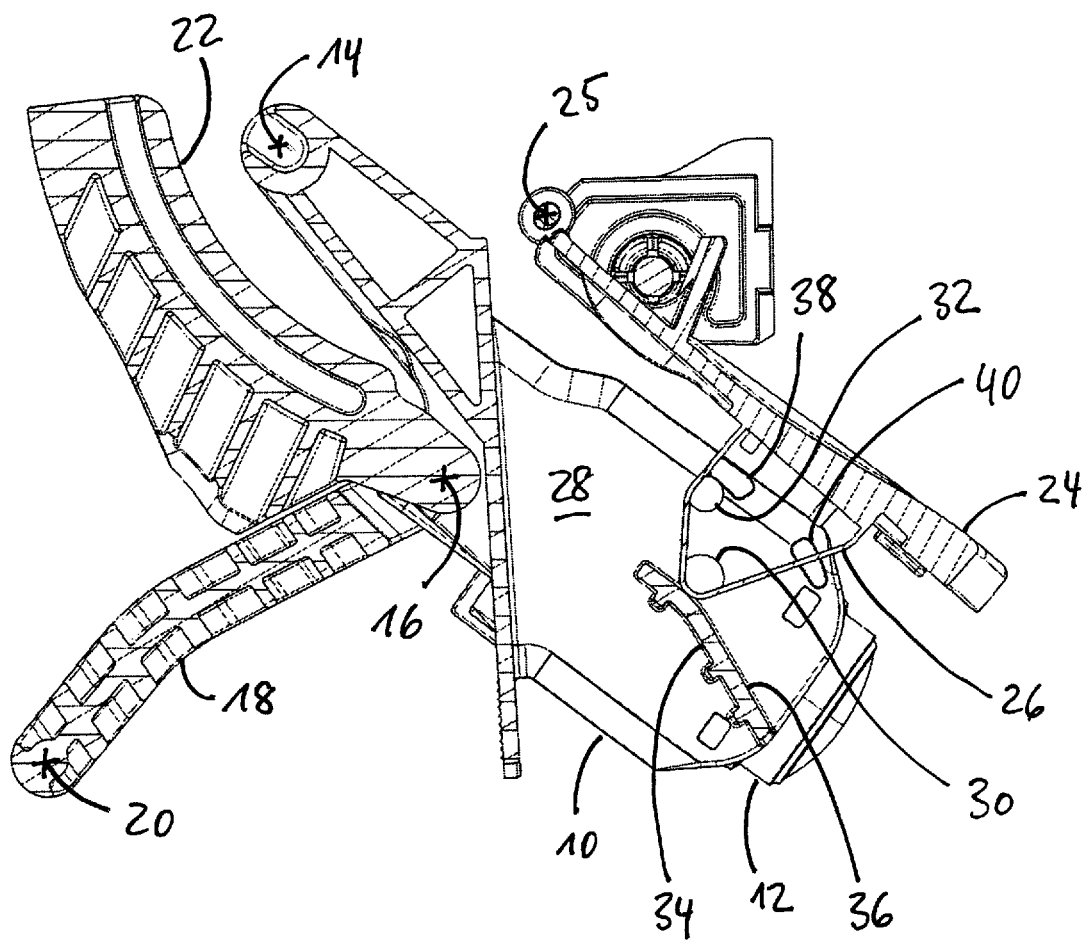

FIGS. 1 to 3 show partial sectional views of a device according to the invention during various stages of the extension movement of an environment detection unit, starting from a resting position (FIG. 1) up to an active position for image acquisition (FIG. 3).

The device shown in the figures has an environment detection unit 10, which in the present exemplary embodiment comprises a backup camera 12 for a motor vehicle.

The environment detection unit 10 is rotatably mounted about a first axis of rotation 14 and a second axis of rotation 16 spaced apart therefrom. The first axis of rotation 14 is slidably guided along a curved backdrop, not shown, while the second axis of rotation 16 is arranged at a first end of a pivot arm 18, the second end of which is rotatably mounted about a third axis of rotation 20.

The environment detection unit 10 can be moved into an active position for image acquisition (FIG. 3) by an extension movement and in a resting position (FIG. 1) by a retraction movement. The extension and retraction movements of the environment detection unit 10 are brought about by a drive unit, which comprises a toothed rack 22, which is articulately connected to the environment detection unit 10. In the present exemplary embodiment, the toothed rack 22 engages in the area of the first end of the pivoting arm 18 on the environment detection unit 10 such that the second axis of rotation 16 and the articulation axis of the toothed rack 22 coincide. Due to the biaxial mounting of the environment detection unit 10 and the curved shape of the toothed rack 22, the environment detection unit 10 performs a combination of rotation and translation during the extension and retraction movements.

In the resting position, the environment detection unit 10 is accommodated in a housing (not shown in detail) which comprises a housing wall which delimits a housing opening through which the environment detection unit 10 can extend from its resting position into its active position or retract from its active position into its resting position. The housing wall carries a sealing element which at least approximately completely surrounds the housing opening.

A camera cover 24 is attached to the housing and is mounted around a fourth axis of rotation 25 and can be pivoted against the resetting force of a spring element, not shown, between a closed position shown in FIG. 1 and an open position shown in FIG. 3. In its closed position, the camera cover 24 closes the housing opening in order to protect the environment detection unit 10, which is in the resting position, from external influences. In other words, the camera cover 24 forms a protective element.

On one side of the camera cover 24 facing the environment detection unit 10, two projections 26 are formed which are spaced apart from one another and extend in the direction of the environment detection unit 10 and overlap one another on opposite side surfaces 28 of the environment detection unit 10. In other words, the extensions 26 accommodate a part of the environment detection unit 10 between them.

In an end region of each extension 26 which is remote from the camera cover 24, a cam 30 facing the other extension 26 is formed. In addition, each extension 26 is provided with a second cam 32, which also faces the other extension 26. The second cam 32 is spaced apart from the first cam 30 of the same extension 26 and is arranged closer to the camera cover 24.

On each of its opposite side surfaces 28, the environment detection unit 10 has a rib 34, which forms a guideway 36 for each of the first cams 30. The design of the guideways 36 and the arrangement of the first cams 30 are matched to one another such that the first cams 30 always, i.e. in any position of the environment detection unit 10 are supported on the ribs 34. In other words, the camera cover 24 always lies laterally against the environment detection unit 10.

If the environment detection unit 10 is extended from the resting position (FIG. 1) into the active position (FIG. 3), it presses the camera cover 24 against the resetting force of the spring element via its lateral ribs 34 and the first cams 30 located on the extensions 26.

The lateral ribs 34 thus form pressing elements for the camera cover 24. Due to the rotational/translational movement which the environment detection unit 10 performs during the extension movement, each first cam 30 moves along the guideway 36 assigned to it.

When the environment detection unit 10 approaches its active position, i.e. the extension movement is in its final phase, the second cams 32 come into engagement with first projections 38, which are formed on the side surfaces 28 of the environment detection unit 10, in such a way that the first and second cams 30, 32 of each extension 26 come to lie between the assigned rib 34 and the assigned first projection

38. The surface of the assigned first projection 38 facing the second cam 32 is arranged obliquely in such a way that the first and second cams 30, 32 of each extension 26 are accommodated without play between the assigned rib 34 and the assigned first projection 38 at the end of the extension movement, that is to say when the environment detection unit 10 assumes its active position. In this situation, the camera cover 24 is secured by the first projections 38 from being lifted away from the environment detection unit 10, i.e. it cannot be opened any further. In other words, the first projections 38 form securing elements for the camera cover 24.

If the environment detection unit 10 is retracted again, the second cams 32 and the first projections 38 again come out of engagement and the camera cover 24 is only pressed against the environment detection unit 10 by the spring element, i.e. only the first cams 30 are supported on the ribs 34.

If the environment detection unit 10 approaches its resting position, i.e. if the retraction movement is in its final phase, the second cams 32 come into engagement with second projections 40, which are each spaced apart from the first projections 38 on the side surfaces 28 of the environment detection unit 10. In particular, the second cams 32 come into engagement with the second projections 40 in such a way that the first and second cams 30, 32 of each extension 26 come to lie between the associated rib 34 and the assigned second projection 40. The surface of the assigned second projection 38 facing the second cam 32 is arranged obliquely such that the first and second cams 30, 32 of each extension 26 are accommodated without play between the assigned rib 34 and the assigned second projection 38 at the end of the retraction movement, that is to say when the environment detection unit 10 assumes its rest position.

Through the second projections 40, the camera cover 24 located in the resting position of the environment detection unit 10 is actively pulled closed against the seal surrounding the housing opening, which is why the second projections 40 can also be referred to as closing elements. The camera cover 32 is consequently not only pressed against the seal by the spring element, but is additionally pulled against the seal by the closing elements, as a result of which the environment detection unit 10 is permanently and reliably protected against external influences and, in addition, an undesirable noise development through rattling of the camera cover 24 is avoided.

LIST OF REFERENCE NUMBERS

10 Environment detection unit
12 Backup camera
14 First axis of rotation
16 Second axis of rotation
18 Pivot arm
20 Third axis of rotation
22 Toothed rack
24 Camera cover
25 Fourth axis of rotation
26 Extension
28 Side surface
30 First cam
32 Second cam
34 Rib
36 Guideway
38 First projection
40 Second projection

The invention claimed is:

1. A device for a motor vehicle, the device comprising:
a protective element which can be pivoted from a closed position into an open position;
an environment detection unit which can be brought into an active position for image acquisition by an extension movement and by a retraction movement into a resting position in which the environment detection unit is arranged to be externally inaccessible behind the protective element located in the closed position; and
a drive unit acting on the environment detection unit for moving the environment detection unit, the environment detection unit having an end face facing the protective element and two adjoining side surfaces;
wherein a pressing element for pushing on the protective element during the extension of the environment detection unit and a separate closing element for closing the protective element during the retraction of the environment detection unit are formed on at least one of the side surfaces;
wherein on the side surface a securing element for securing the protective element is formed on the environment detection unit located in the active position, and
wherein the protective element comprises a second cam which can be gripped behind by the securing element when the environment detection unit is in the active position.

2. The device according to claim 1,
wherein the pressing element forms a lateral rib through which the protective element can be pivoted into the open position when the environment detection unit is extended via a first cam of the protective element supported on the rib.

3. The device according to claim 1,
wherein the closing element is temporarily effective.

4. The device according to claim 3,
wherein the closing element is temporarily effective during an end phase of the retracting movement of the environment detection unit.

5. The device according to claim 1,
wherein the closing element is formed by a lateral projection.

6. The device according to claim 1, wherein the securing element is arranged separately from the pressing element and the closing element.

7. The device according to claim 1, wherein the securing element is formed by a lateral projection of the environment detection unit.

8. The device according to claim 1, wherein the securing element is temporarily effective.

9. The device according to claim 8,
wherein the securing element is temporarily effective during an end phase of the extension movement of the environment detection unit.

10. The device according to claim 1,
wherein when the environment detection unit is in the active position and the second cam is gripped behind by the securing element, a first cam and the second cam of the protective element are accommodated without play between the pressing element and the securing element.

11. The device according to claim 1,
wherein a pressing element, a closing element and/or a securing element are/is formed on opposite side surfaces of the environment detection unit.

12. The device according to claim 1,
wherein the protective element comprises at least one extension which overlaps with a side surface of the environment detection unit and on which a first cam and/or a second cam are/is formed.

13. The device according to claim 1,
wherein the protective element comprises two extensions which overlap with opposite side surfaces of the environment detection unit and on which a first and/or a second cam are/is formed.

14. The device according to claim 1,
wherein the, or each, side surface of the environment detection unit is oriented essentially at right angles to the protective element.

15. The device according to claim 1,
wherein the protective element is pulled through the environment detection unit in the resting position against a sealing element which is arranged in the region of a housing opening to be closed by the protective element.

16. The device according to claim 1,
wherein the protective element is pulled through the environment detection unit in the resting position against a sealing element which is arranged in the region of a housing opening to be closed by the protective element which the housing opening at least almost completely surrounds.

17. A device for a motor vehicle, the device comprising:
a protective element which can be pivoted from a closed position into an open position;
an environment detection unit which can be brought into an active position for image acquisition by an extension movement and by a retraction movement into a resting position in which the environment detection unit is arranged to be externally inaccessible behind the protective element located in the closed position; and
a drive unit acting on the environment detection unit for moving the environment detection unit, the environment detection unit having an end face facing the protective element and two adjoining side surfaces;
wherein a pressing element for pushing on the protective element during the extension of the environment detection unit and a separate closing element for closing the protective element during the retraction of the environment detection unit are formed on at least one of the side surfaces, and
wherein the protective element comprises a second cam which can be gripped behind by the closing element when the environment detection unit is in the resting position.

18. The device according to claim 17,
wherein when the environment detection unit is in the resting position and the second cam is gripped behind by the closing element, a first cam and the second cam of the protective element are accommodated without play between the pressing element and the closing element.

* * * * *